Figure 1:
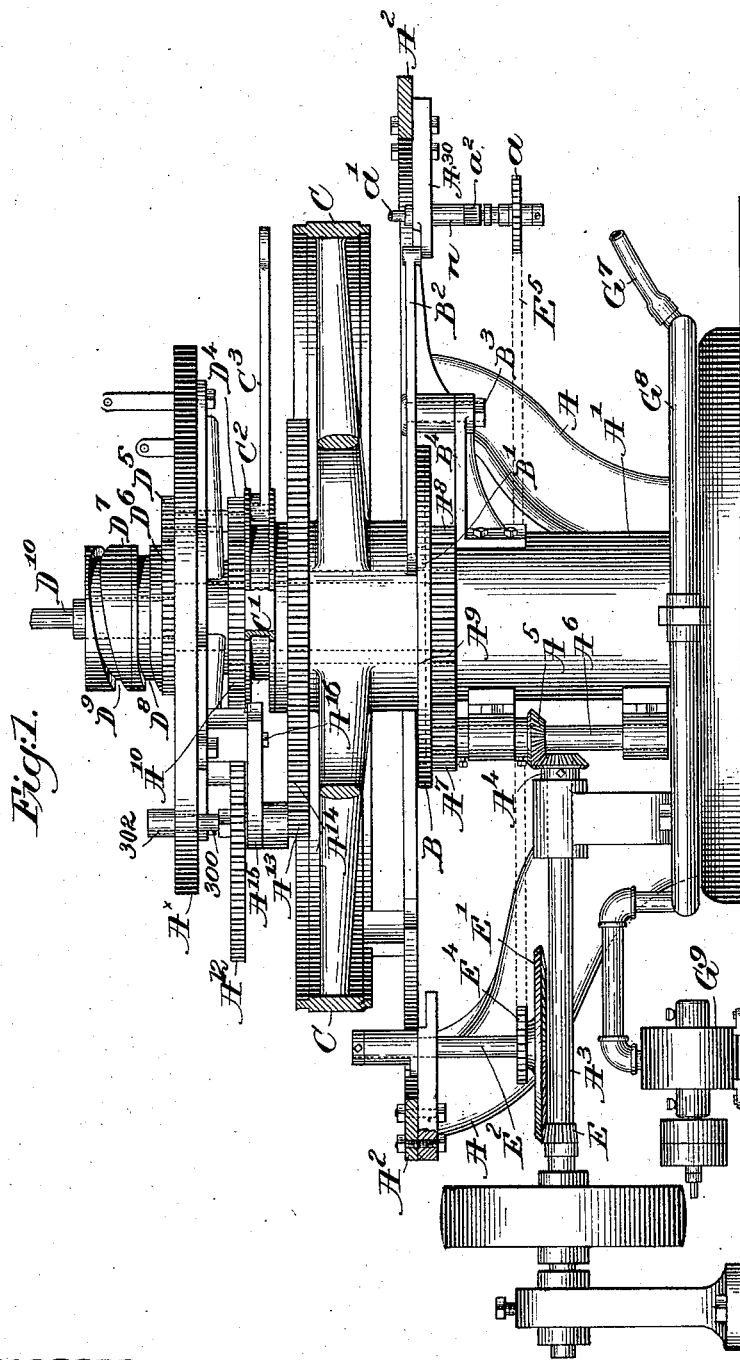

(No Model.)  
11 Sheets—Sheet 2.

H. H. CUMMINGS.
PRINTING PRESS.

No. 577,100. Patented Feb. 16, 1897.

Witnesses.  
A. D. Harmon  
Fred S. Greenleaf

Inventor.  
Henry H. Cummings  
by Crosby & Gregory  
Attys

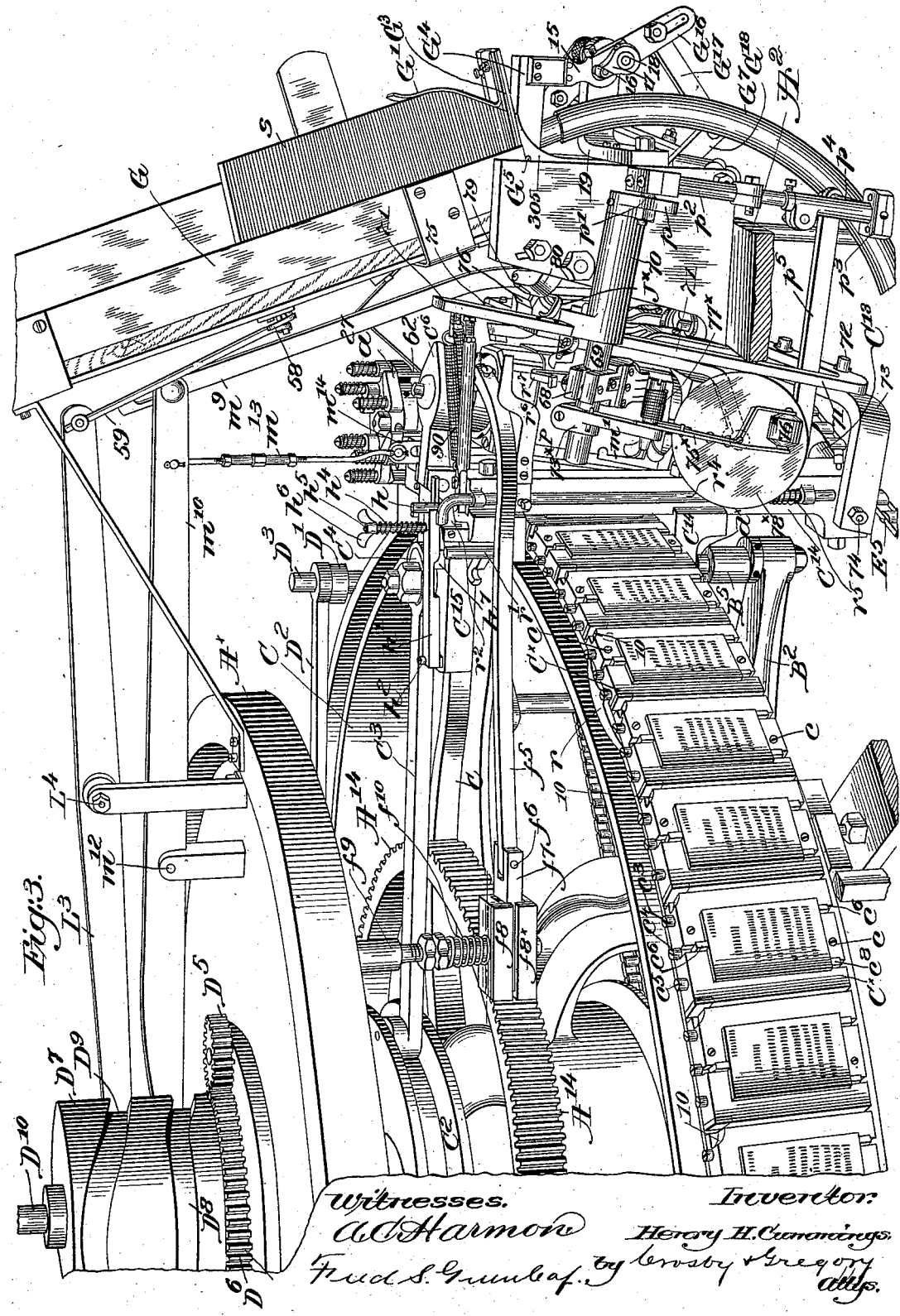

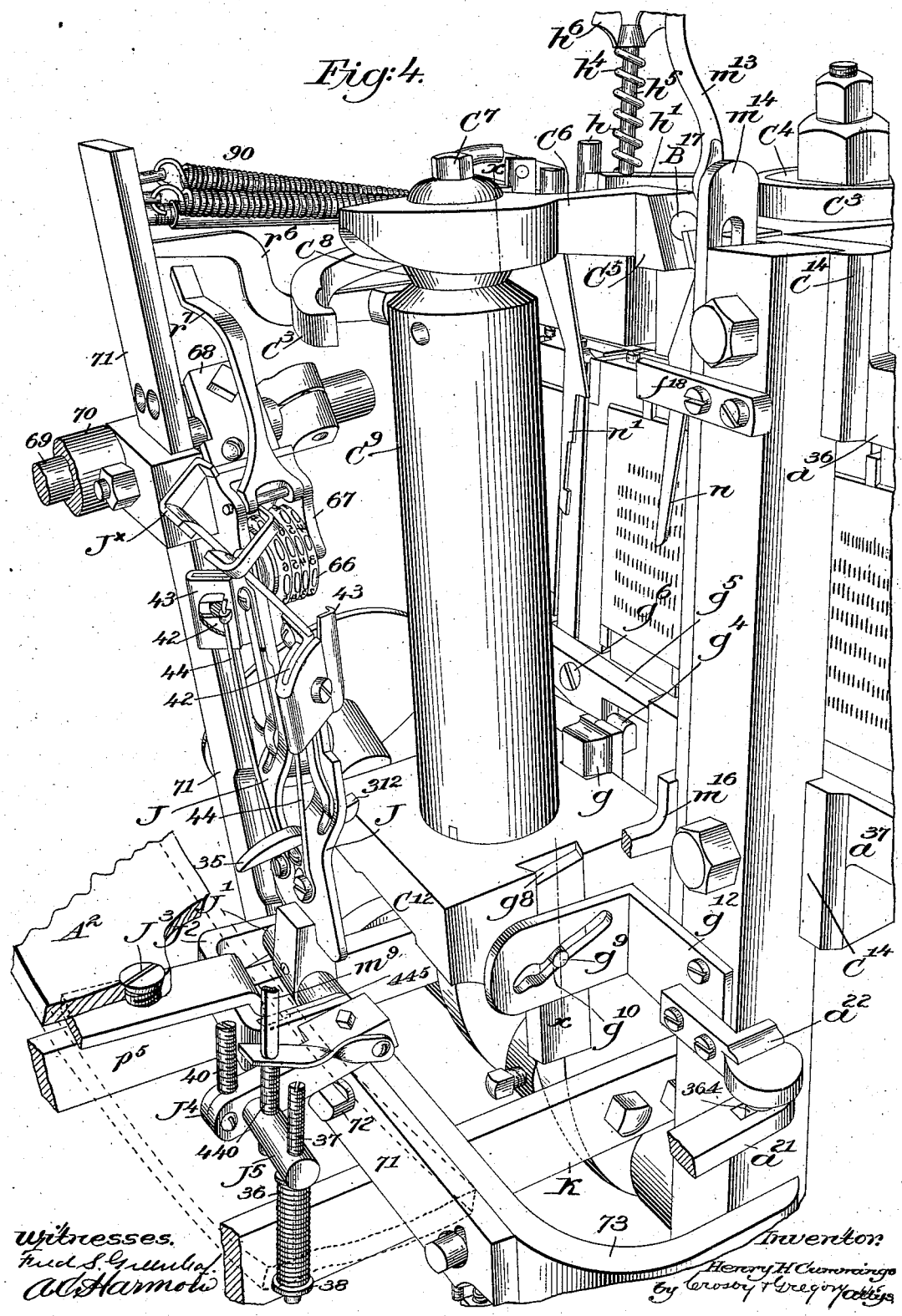

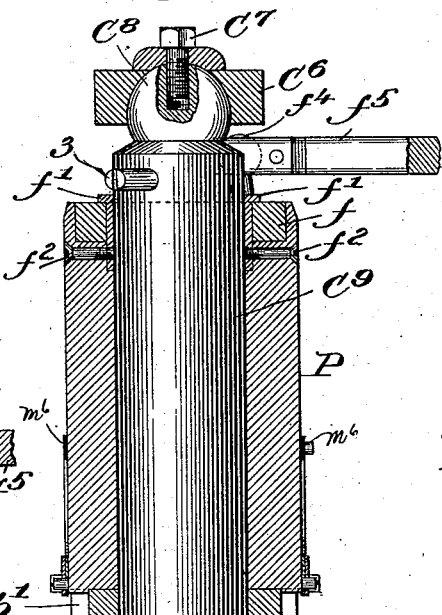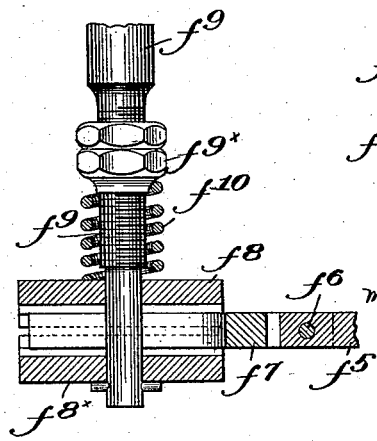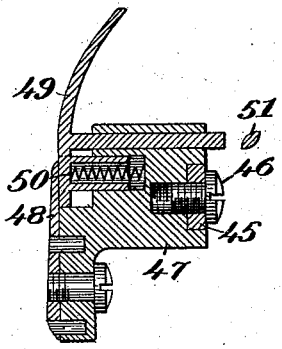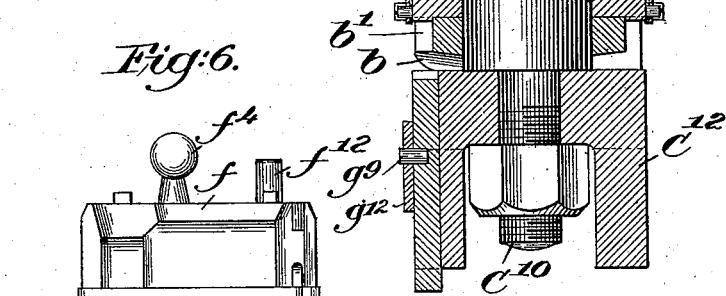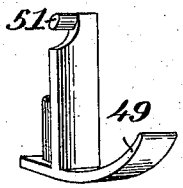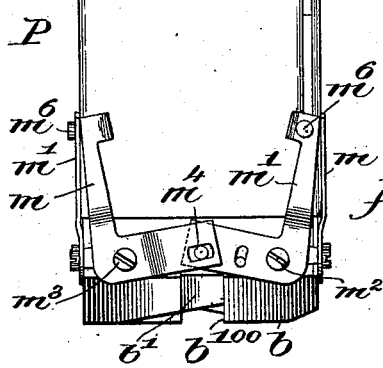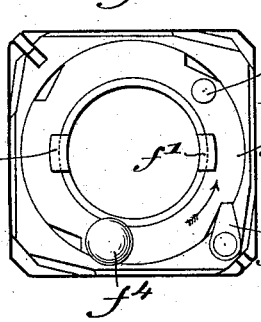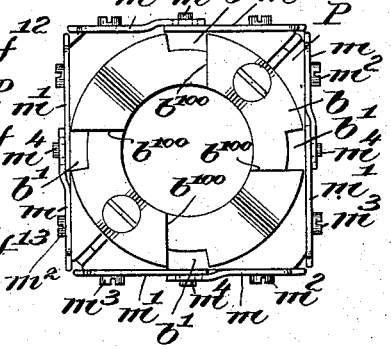

(No Model.) 11 Sheets—Sheet 6.

H. H. CUMMINGS.
PRINTING PRESS.

No. 577,100. Patented Feb. 16, 1897.

Witnesses.
Edward F. Allen.
A. C. Harmon

Inventor:
Henry H. Cummings
by Crosby & Gregory
attys.

(No Model.) 11 Sheets—Sheet 7.
H. H. CUMMINGS.
PRINTING PRESS.
No. 577,100. Patented Feb. 16, 1897.
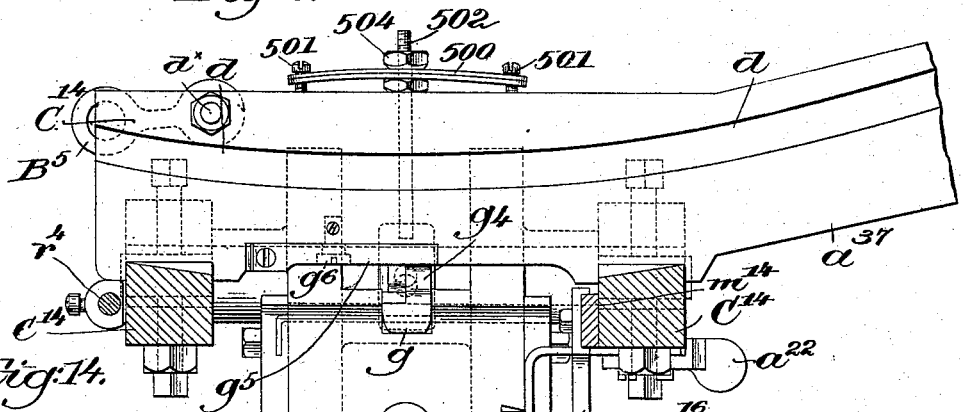
Fig. 13.
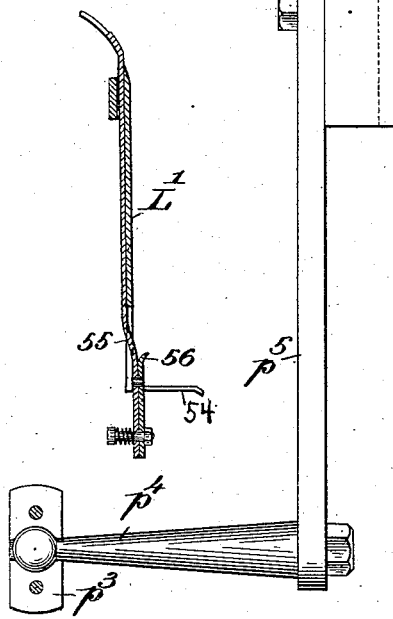
Fig. 14.
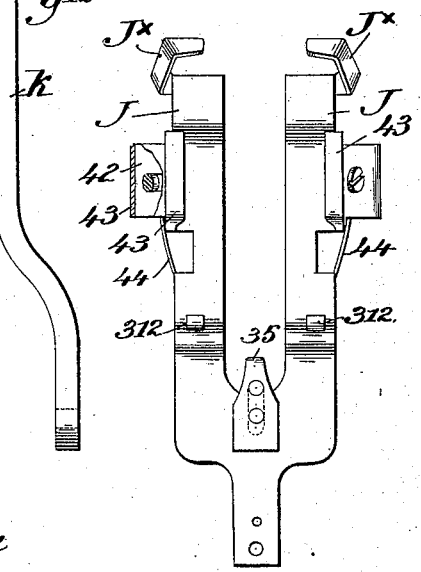
Fig. 15.
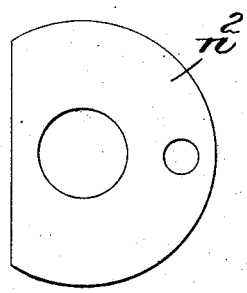
Fig. 13ª.
Witnesses.
Fred S. Greenleaf.
A. D. Harmon
Inventor.
Henry H. Cummings.
by Crosby & Gregory
attys.

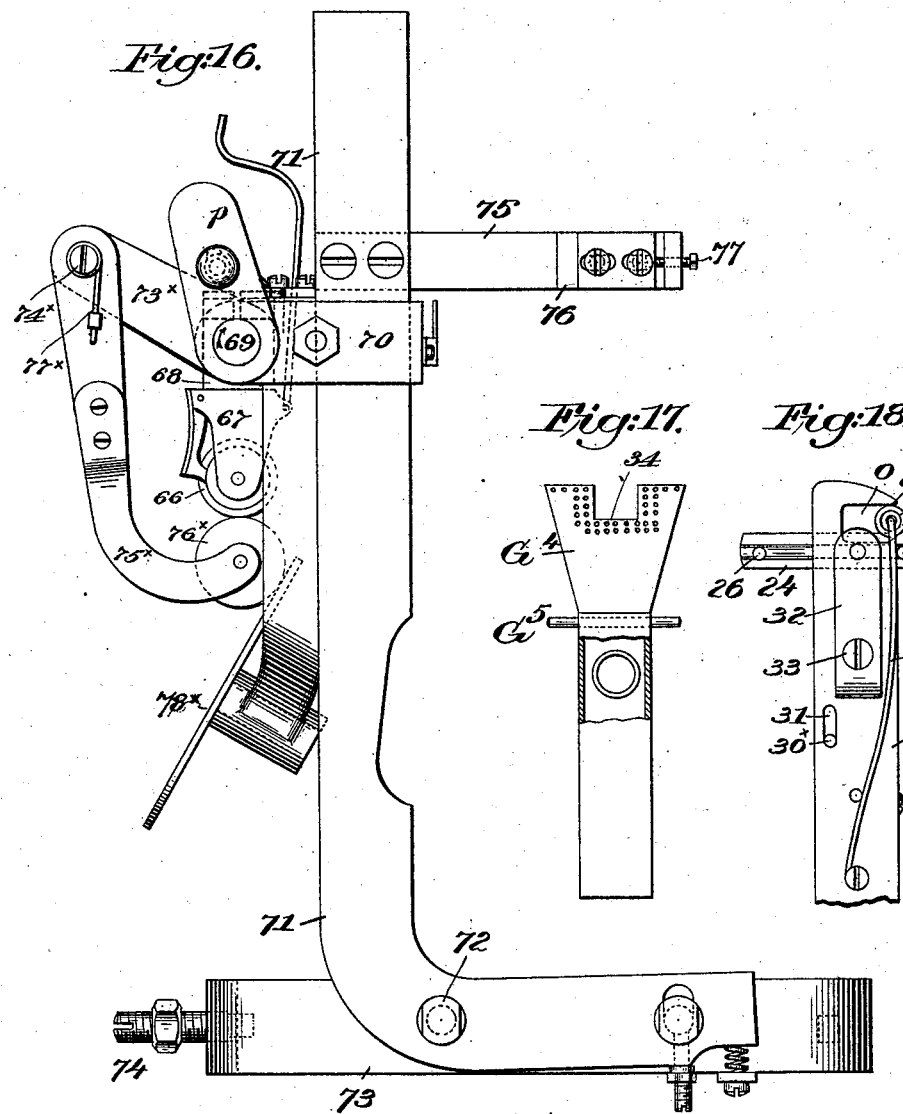

(No Model.)　　　　　H. H. CUMMINGS.　　　11 Sheets—Sheet 9.
PRINTING PRESS.
No. 577,100.　　　　　　　　　Patented Feb. 16, 1897.
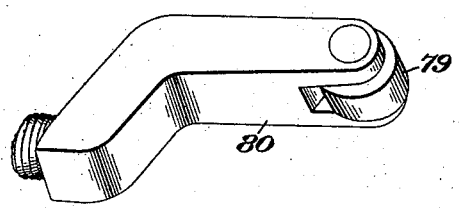
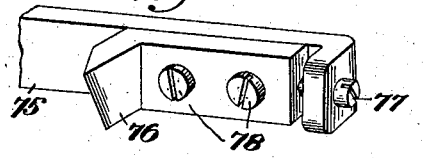
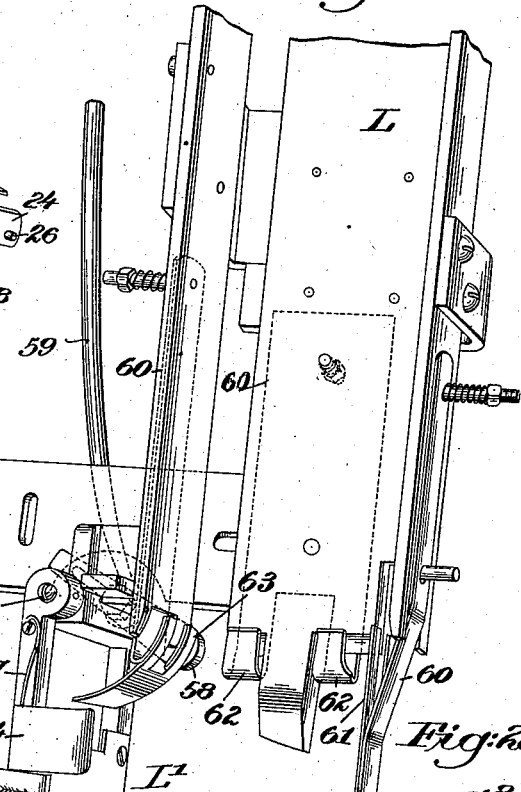
Witnesses.　　　　　　　　　　　Inventor.

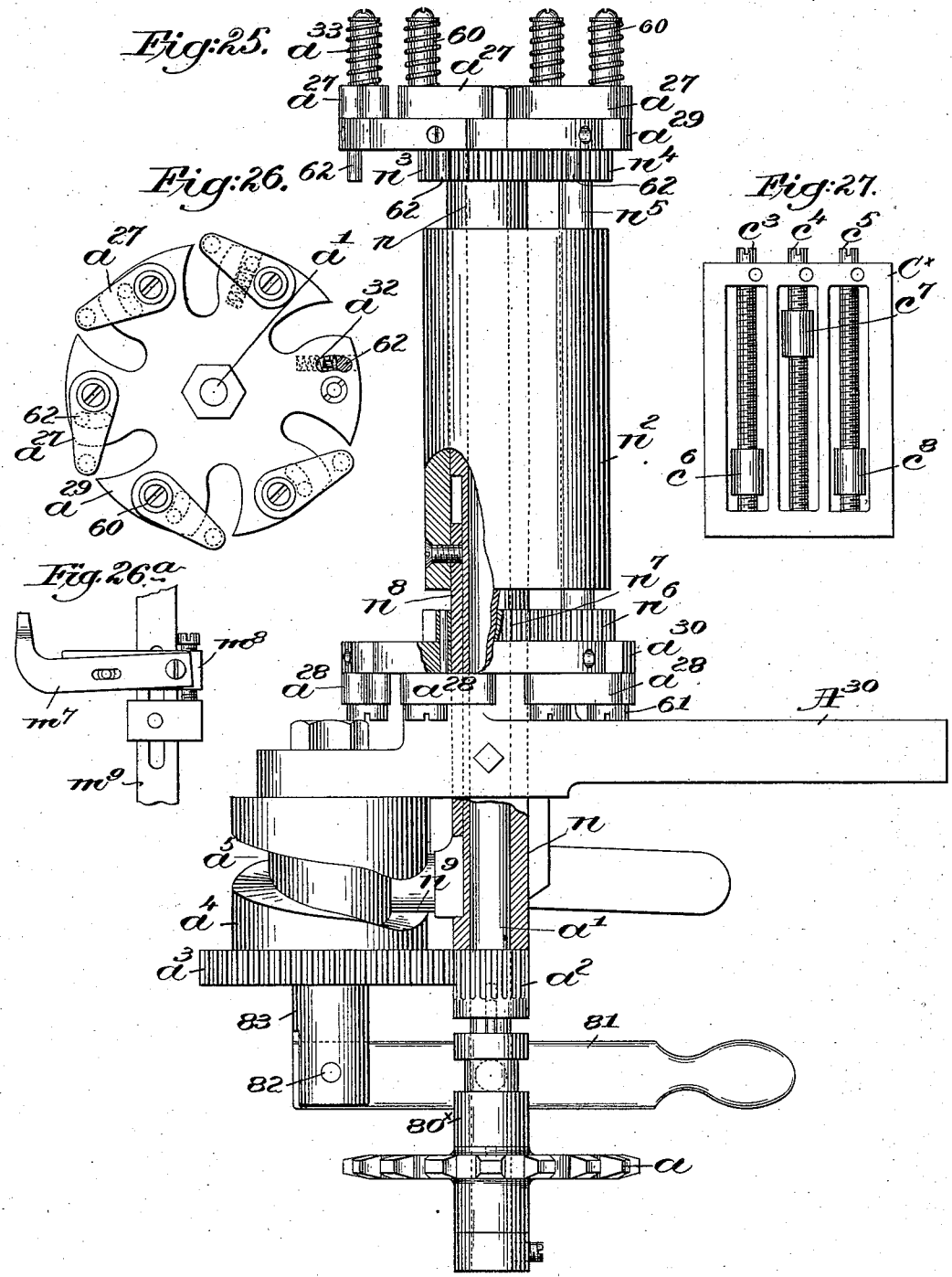

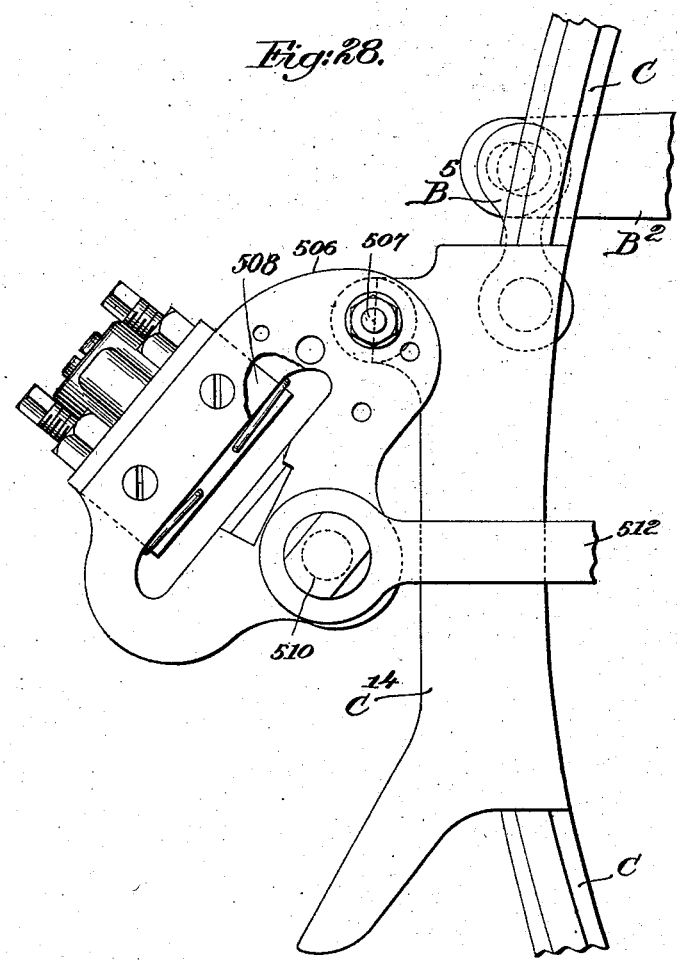

UNITED STATES PATENT OFFICE.

HENRY H. CUMMINGS, OF MALDEN, MASSACHUSETTS, ASSIGNOR TO THE NEW MULTIPLE PRESS COMPANY, OF BOSTON, MASSACHUSETTS.

PRINTING-PRESS.

SPECIFICATION forming part of Letters Patent No. 577,100, dated February 16, 1897.

Application filed July 30, 1894. Serial No. 519,030. (No model.)

*To all whom it may concern:*

Be it known that I, HENRY H. CUMMINGS, of Malden, county of Middlesex, State of Massachusetts, have invented an Improvement in Printing-Presses, of which the following description, in connection with the accompanying drawings, is a specification, like letters and figures on the drawings representing like parts.

This invention has for its object the production of a novel printing-press more especially adapted for printing matter which is to be automatically collated in regular order or consecutively, said press being extremely useful for printing, say, weekly-offering envelops, calendars, cards for games, or any cards or sheets which it is desired to print and collate as a continuous operation.

My novel press also has means whereby the envelops, cards, or sheets being printed may be numbered to designate the order of their arrangement in packages.

In my novel press the envelop, card, or sheet to be printed, and which may hereinafter, for the sake of brevity, be designated by the term "sheet," is taken automatically from a pile in a supply-box, is fed to a multisided platen, which besides being moved toward and from the "form," as I shall designate the stereotype or other plate or the types used, is also rotated to thereby enable one side of the platen to be supplied with a sheet while another sheet held at another side of the platen is being numbered and another sheet at another side of the platen is being printed, and yet it may be at another side of the platen a numbered and printed sheet may be being delivered.

The numbered and printed sheet taken from the platen is automatically transferred into a receiving-box. For this class of work, in order that the same may be done expeditiously, and therefore practically, I employ a number of forms which are arranged in the proper order about a movable bed, herein shown as of circular shape or outline, the form or type being held each in a proper block or chase, said blocks or chases being connected to said bed.

The bed has combined with it suitable mechanism whereby it may be moved, the movement in the form in which I have herein chosen to illustrate my invention being circular and rotary.

During the time that the sheet carried by the platen is held in printing contact with the form which is revolving on the bed the said platen and bed are locked or coupled together, so that the platen and bed travel in unison for a short distance, and to enable this to be done the platen is mounted upon a carriage which in this instance of my invention is shown as supported upon the movable bed.

I have combined with the multisided platen a numbering mechanism having inking devices, said mechanism, also designated by the term "auxiliary printing mechanism," also printing the numbers on the sheets while held by the platen, and the numbering mechanism is automatically ratcheted along to increase the printing-number one for each rotation of the bed.

I have devised a novel inking mechanism for inking the forms.

The inking-rolls are supplied at the proper times with ink by means of a ductor-roll carried by a lever or finger which is vibrated between the fountain and the said inking-rolls.

The sheets to be printed will preferably be arranged in a pile in the supply-box, and the pile will be so laid that the main part of the weight of the mass resting on the bottom plate of the supply-box will fall upon the outer ends of the lowermost sheets, leaving their inner ends under but little weight in order that the separating device, to be described, when the same is to act upon the inner end of the lowermost sheet of the pile may readily detach the end of said sheet from the sheet above it in order that its ends may be engaged by the carrier which is to take the sheet from the pile and transfer it to the holding mechanism carried by the platen.

The separating device is shown as pneumatically operated, or, in other words, it is a suction device working continually to cause the inner end of the lowermost envelop of the pile to adhere to it.

It is very essential in a practical machine of the class described where the printed sheets are to be collated that the carrier to be employed and the separator should always work.

One part of my invention consists in a press containing the following instrumentalities, viz: a continuously-rotating form-bed having a plurality of forms, a multisided platen provided with sheet-holders, and means to rotate said platen and to move the same toward and from said form-bed, substantially as will be described.

Other features of my invention will be hereinafter described, and particularly pointed out in the claims.

Figure 2:
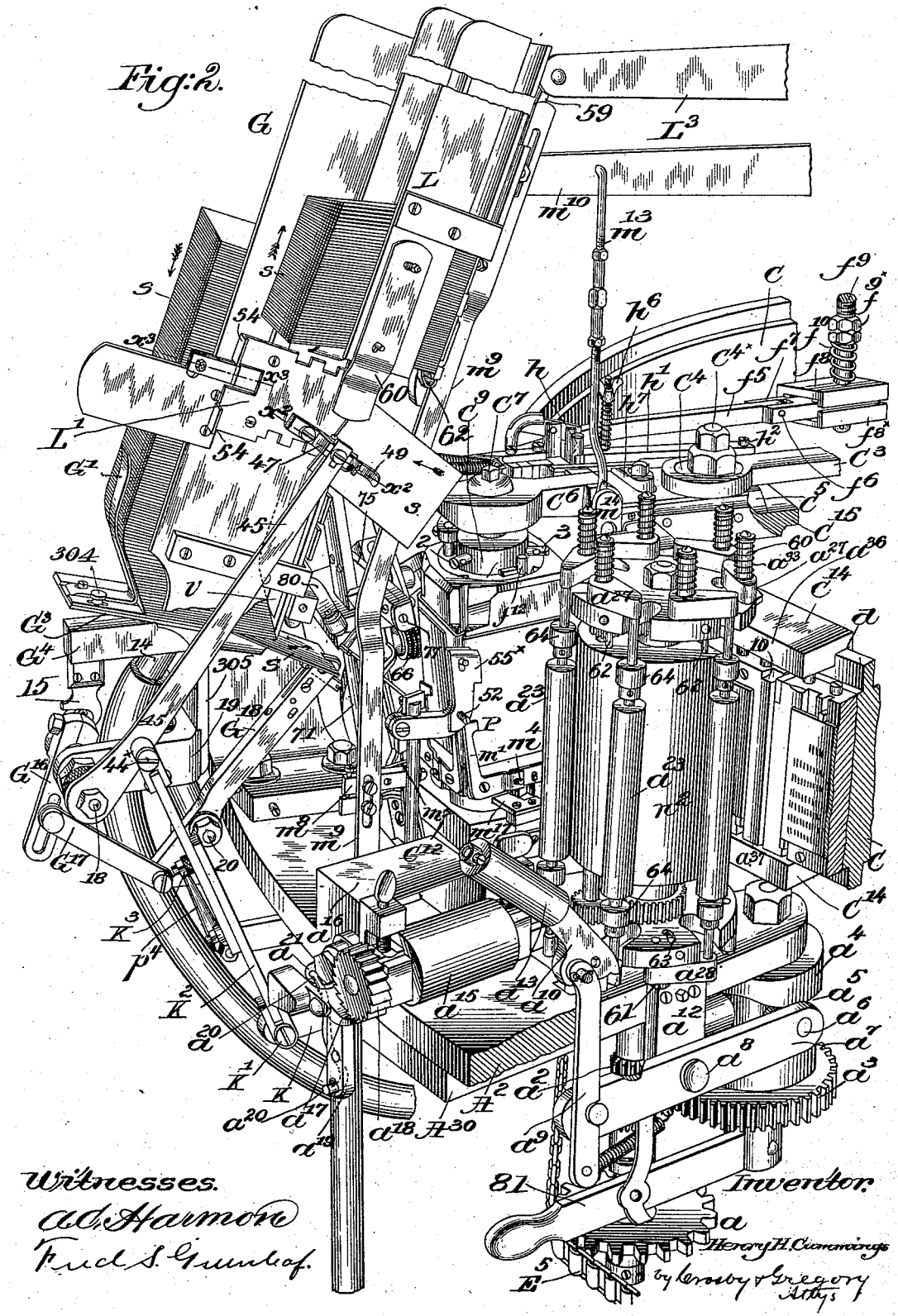
Figure 12:
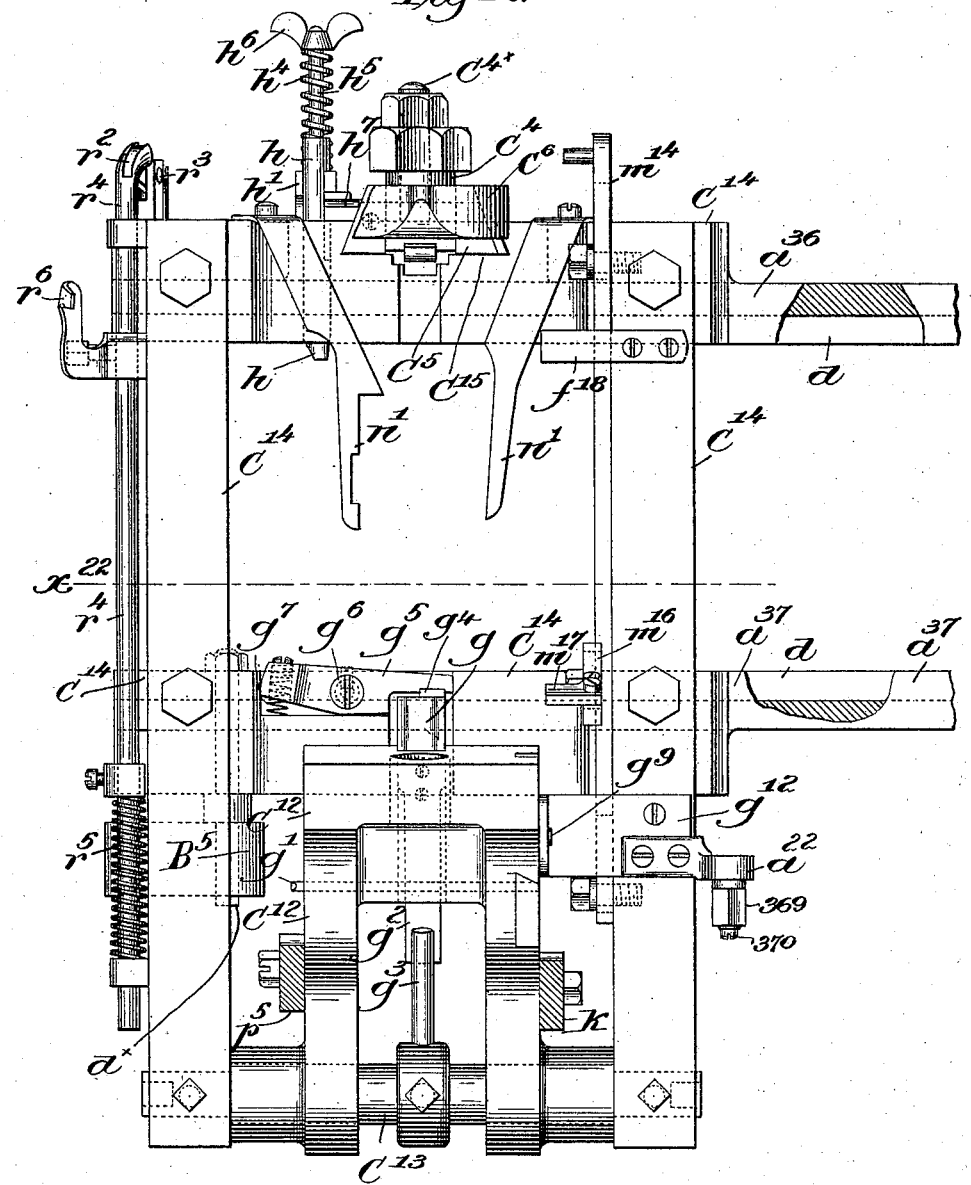
Figure 12A:
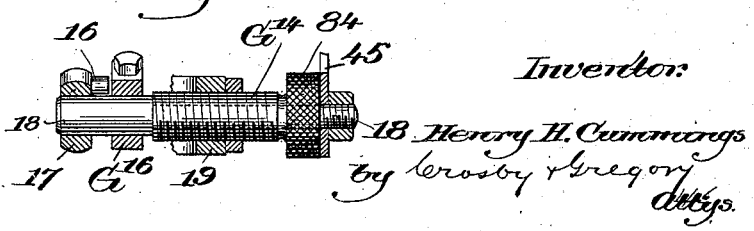

Figure 1, in elevation, shows the central portion of my novel press, the bed carrying the forms being broken out, the form being omitted, the parts outside the said bed being chiefly omitted because fully shown in other drawings on an enlarged scale, Fig. 1 being made chiefly to illustrate the driving parts. Fig. 2 is a perspective view of part of the movable form-bed with attached forms, the inking mechanism for the forms, the sheet-feeding mechanism, the platen and numbering mechanism, the carrier for feeding the sheets to the platen being shown as having caught a sheet and as carrying it toward the platen, the latter being then at rest in its outward position. Fig. 3 is a perspective view looking at the parts shown in Fig. 2 from the opposite side of the supply-box. Fig. 4 is an enlarged detail looking at the machine from the point of view occupied for Fig. 2, the platen being removed from the head and post carrying it, the inking mechanism for the forms, and the supply and receiving boxes and the carrier and sheet-delivery mechanism being omitted. Fig. 5 is a partial vertical section to the left of the line $x$, Fig. 4. Fig. 6, in elevation, shows the platen removed with the sheet-holder open. Fig. 7 is a top view of the platen with its contained pawl-ring; Fig. 8, a bottom view of the platen to show its attached notched ring. Fig. 9 is a detail showing part of the stud $f^9$, holding the friction-box $f^8$, the latter being in section along the dotted line shown thereon in Fig. 3, where the said parts are represented in working position. Fig. 10 is a section of the delivery-nippers along the dotted line $x'$, Fig. 2. Fig. 11 shows the movable delivery-nipper of Fig. 10 detached; Fig. 12, a front view of the carriage to be referred to, which contains the head on which is mounted the platen, the connected tracks on which run the antifriction-wheels of the inking-rollers being partially broken out; Fig. 12$^a$, a detail of the rock-shaft 18 and its bearings. Fig. 13 is a section below the line $x^{22}$, Fig. 12. Fig. 13$^a$ is an end view of the distributing-bed. Fig. 14 is a section in the line $x^3$, Figs. 2 and 24, chiefly to show the sheet-clamping jaw. Fig. 15 is an inner side view of the sheet-guide detached from the framework, one of the side edge guides being broken out to show the wing on which said guide is free to slide. Fig. 16, on an enlarged scale, shows the lever which is instrumental in actuating the numbering mechanism and showing the numbering mechanism in the position when the numbering-head is taking ink; Fig. 16$^a$, a top view of the bottom plate of the supply-box. Fig. 17 shows in top view, partially broken, the separator to pull down the inner end of the bottom sheet of a pile of sheets; Fig. 18, a view of the opposite side of the carrier to that shown in Figs. 2 and 21; Fig. 19, an enlarged view of a finger attached to the framework; Fig. 20, an enlarged view of a heel-piece attached to the lever shown in Fig. 16 and adapted to strike against the roller shown in Fig. 19. Fig. 21 shows one side of the carrier as holding a sheet and on its way to the platen; Fig. 22, a detail showing the opening device for the sheet-holders. Fig. 23 shows part of the head and the auxiliary locking device for the platen. Fig. 24 is a detail showing the sheet-receiving box and its bottom plate open; Fig. 25, a detail showing part of the form-inking mechanism detached from the machine and partially broken out, the inking-rollers being omitted. Fig. 26 is a plan view of the uppermost roller-carrying disk of the inking mechanism, one of the arms $a^{27}$ being omitted; Fig. 26$^a$, a detail of the block $m^8$ and spring-wing $m^7$. Fig. 27 shows the rear side of one of the forms detached. Fig. 28 shows a modification to be described.

The framework shown has a foot from which rise arms A and A', provided with a post (shown by dotted lines) to which is fixed a top plate A$^\times$, said framework also having a bed-plate A$^2$.

The machine to be described derives its rotation from a power-shaft A$^3$, in practice driven from any suitable source at any desired speed, said power-shaft being provided with any usual or suitable friction or clutch pulleys to control its speed and its times of motion and rest.

The power-shaft has a bevel-pinion A$^4$, which engages a bevel-pinion A$^5$, fast on a short shaft A$^6$, having a pinion A$^7$, which engages a toothed gear A$^8$, attached to a hollow shaft A$^9$, (shown by dotted lines in Fig. 1,) said hollow shaft surrounding the post part of the column A'.

The hollow shaft carries a cam B, provided at its upper side with a suitable cam-groove, which receives a roller or other stud B' on a lever B$^2$, mounted on a stud B$^3$, carried by a bracket B$^4$, herein shown as fixed to the framework, the opposite end of said lever being connected by a link B$^5$ with a suitable carriage C$^{14}$, to be described, said carriage carrying the platen to be described.

The hollow shaft A$^9$ at its upper end has attached to it a gear A$^{10}$, which engages an intermediate gear A$^{12}$ on a short shaft 300, provided with a pinion A$^{13}$, which engages a toothed wheel A$^{14}$, fast on the hub of the form-bed C, thus rotating said bed continuously.

The shaft 300, holding the gear $A^{12}$, is mounted in a movable journal-bearing 302 and in a yoke $A^{15}$, secured in an adjustable manner by set-screws $A^{16}$ to the top plate $A^\times$, so that said yoke may be adjusted to throw the toothed pinion $A^{13}$ out of mesh with the gear-toothed wheel $A^{14}$ whenever it is desired to stop the rotation of the form-bed.

The hollow shaft $A^9$, before described, forms a bearing for the hub of the form-bed, and said hollow shaft is provided with an eccentric $C'$, which is surrounded by an eccentric-strap $C^2$, having jointed to it a link $C^3$, in turn applied to an eccentric $C^4$, mounted on a stud $C^{4\times}$, fixed upon a slide $C^5$, having pivoted upon it an arm $C^6$, having a semispherical seat, which is held by screw $C^7$ to the ball-like upper end $C^8$ of a stud $C^9$, fixed by suitable nut $C^{10}$ (see Fig. 5) to a swinging head $C^{12}$, mounted upon a stud $C^{13}$, attached to the lower ends of the side pieces (see Fig. 12) of a carriage $C^{14}$, (see Figs. 2, 4, 12, and 13,) said carriage having a guideway $C^{15}$ in which may be reciprocated the said slide $C^5$, the stud $C^9$ referred to receiving upon it the revoluble platen P. Thus by means of the mechanism just described the platen is swung back and forth in relation to the continuously-moving form-bed by each reciprocation of the longitudinally-moving link $C^3$. This link so reciprocates as each form comes before the platen by reason of the fact in the present instance that the gears are so proportioned that the number of rotations of the sleeve $A^9$ (and hence of the eccentric $C'$) to one rotation of the form bed or carrier equals the number of forms carried on said bed.

The eccentric-strap $C^2$ referred to is prevented from rotating with the eccentric by some suitable device, as, for instance, a link $D^2$, mounted loosely upon the upper end of a stud $D^3$, suitably supported upon the framework, a suitable collar $D'$ on said stud sustaining the weight of the said link.

The toothed gear $A^{10}$, fast on the hollow shaft $A^9$, also engages a pinion $D^4$, fast on the lower end of a short shaft, (see Fig. 1,) extended through suitable bearings sustained by the top plate $A^\times$, the upper end of said shaft having a pinion $D^5$, which engages a toothed gear $D^6$, connected to or forming part of a cam-hub $D^7$, having two cam-grooves $D^8$ $D^9$, said cam-hub being free to rotate about a stud $D^{10}$, screwed into or suitably fixed to the upper end of the post heretofore described as connected to the column $A'$.

The power-shaft $A^3$ has, as shown, a small bevel-gear E, which engages a bevel-gear $E'$, loose on a short stud $E^2$, supported in suitable bearings in the framework, said gear having a sprocket-wheel $E^4$ attached to it, which, through a suitable sprocket-chain $E^5$, engages and rotates a sprocket-wheel $a$, normally loose on a shaft $a'$, (see Figs. 1 and 25,) to be described, said chain in its run passing over other suitable sprocket-wheels, (not shown,) which act merely as guides for the chain in order that it may apply its power at the desired point.

The upper and lower edges of the form-bed C are suitably cut away or shaped to constitute tracks upon which may slide the carriage $C^{14}$ referred to.

The periphery of the form-plate has attached to it by screws $c$ a series of plates or chases $C^\times$, adapted to receive or hold an electrotype or a series of type to constitute a form. In the present embodiment of my invention said plates are adapted to receive an electrotype and to hold said electrotype in place. The plate (see Fig. 27) is provided with three screws $c^3$ $c^4$ $c^5$, upon which are mounted dogs $c^6$ $c^7$ $c^8$, which, extending through slots in the plate, engage the stereotype-plate and clamp it firmly in position. Any desired number of these forms may be used, they containing any desired type or other thing to be printed.

The carriage $C^{14}$ referred to consists, essentially, of two plates, each having a like curved groove $d$, (see Fig. 13,) to fit the upper and lower edges of the form-bed C, said plates being connected by like vertical side pieces or bars of the carriage $C^{14}$, (see Fig. 12,) said bars supporting at their lower ends the stud $C^{13}$, the lowermost plate of the carriage having a stud $d^\times$, (see Fig. 3,) which is engaged by the link $B^5$, before described, so that the lever $B^2$ is enabled to reciprocate said carriage for a slight distance upon the form-bed, the carriage being so reciprocated when the platen P is coöperating with the form on the form-bed to print, and then the carriage is moved back in the opposite direction to its starting-point, the bed continuing to rotate.

The platen P herein shown consists, essentially, of a four-sided block constituting in reality a series of four platens brought successively into printing operation, as presently described, said block being bored to fit the post $C^9$, the lower end of said platen having let into it a locking-ring $b$, (see Figs. 5, 6, and 8,) having four like notches $b'$.

The upper end of the platen is recessed (see Figs. 2, 5, and 7) to receive loosely a pawl-ring $f$, provided with four notches, said ring being kept loosely in place in the end of said platen by means of suitable keys $f'$, (see Fig. 5,) held in place by screws $f^2$.

The ring $f$ has a stud $f^4$, which receives a link $f^5$, (see Figs. 5 and 6,) jointed at $f^6$ to a foot $f^7$, held in a friction-box composed of two plates $f^8$ $f^{8\times}$, sustained on a suitable stud or stand $f^9$, connected to the top plate $A^\times$, a portion of said stud being provided with a screw-thread, as shown in Fig. 9, upon which is applied a suitable adjusting-nut $f^{9\times}$, which acts on a spring $f^{10}$, resting against the upper member of the friction-box, the foot $f^7$ being slotted, as shown in Fig. 9, to slide in said friction-box as the post $C^9$, carrying the platen, is moved toward and from the form-bed, the friction on the foot in the slide-box effecting the reciprocation of the ring $f$ about the post $C^9$, thus rotating the platen. The ring $f$ has (see Fig. 2) a stop $f^{12}$, which coöperates with two projections 2 3, carried by the post $C^9$.

The upper end of the platen is provided with a pawl $f^{13}$, (see Fig. 7,) which is adapted to be engaged by one after another of the notches in the pawl-ring $f$.

Whenever the platen is being moved toward the form-bed by the link $C^3$ and arm $C^6$ the ring $f$, owing to the fact that the foot $f^7$ is prevented by the friction-box $f^8$ $f^{8\times}$ from sliding, is made to oscillate about the stud $C^9$ as a center in the direction of the arrow on said pawl-ring, (see Fig. 7,) and such movement of the ring always carries one of the notches of said ring just past the end of the pawl $f^{13}$, so that when the platen is next moved away from the form-bed the said ring moving with it acts, by one of its notches, against said pawl, but during the first part of the outward movement of the platen the latter is prevented from being rotated by means of a finger $f^{18}$ (see Figs. 4 and 12) acting by its end against the side of the platen, and at such time the foot $f^7$ is drawn out of said clamp-box, but as soon as the platen passes said finger $f^{18}$ and is left free to turn about post $C^9$ the friction exerted on the foot by the friction-box is sufficient to cause the ring $f$, a notch of which rests against the pawl, to effect a quarter-rotation of the platen before the platen completes its outward movement. In this way the platen is given an intermitting movement about the post $C^9$, it being partially rotated just as it arrives in its outward position away from the form, but having no motion of rotation while approaching the form.

The eccentric on the stud $C^{4\times}$ has a nut-like head, and by turning the eccentric on the said stud the extent of movement of slide $C^5$ may be accurately adjusted to effect just the proper extent of throw of the platen to adjust the degree of its pressure upon the sheet being printed, according to its thickness.

It is also essential in the operation of my press that the platen be locked when in its extreme outward position, for it must then be in a position of registration with relation to the movement of the sheet-carrier, which is to supply the platen with the sheet or thing to be printed, and also with the sheet-delivery devices which are to take the printed and numbered sheet or article from the platen. To do this, I have combined with the platen a suitable locking device or devices, they being carried by the head $C^{12}$ and being adapted to engage the notches in the ring $b$, attached to the lower end of the platen.

The main lock $g$ (see Figs. 4, 12, and 13) consists, essentially, of a finger pivoted on the head $C^{12}$ at $g'$ in a slot at the rear side of the said head, (see Fig. 12,) and adapted to enter that one of the notches $b'$ of ring $b$ which is nearest the form-bed, (see Fig. 4,) a spring-tailpiece $g^2$, (see Fig. 12,) connected with said finger, acting against a pin $g^3$, projecting from a hub secured to the stud $C^{13}$, before described, the said spring in the outward movement of the head and platen meeting said pin just before the platen reaches its outward position, the lock engaging and locking the platen firmly in place, said lock remaining in engagement with the platen until the latter on its return motion toward the form puts the sheet carried by it against the form to effect the printing of the sheet.

The lock $g$ has a heel $g^4$, (see Fig. 4,) which, when the platen is exerting printing pressure, passes a yielding latch $g^5$, (see Fig. 12,) pivoted at $g^6$ and acted upon by a suitable spring $g^7$, the purpose of said latch being to exert enough hold upon the heel during the first part of the outward movement of the platen to pull the lock from the notch in the ring $b$, this happening just about as the platen in its outward movement passes the end of the finger $f^{18}$, at which instant the platen is quickly revolved, as stated, for ninety degrees, and as soon as a second notch of the ring $b$ comes opposite the lock the latter enters the notch and prevents further rotation of the platen until after another impression.

The head $C^{12}$ referred to (see Fig. 4) has at one side a guideway in which is fitted to slide an auxiliary lock $g^8$, (see Figs. 4, 12, 13, and 23,) it having a stud $g^9$, which enters a cam-slot $g^{10}$ in an arm $g^{12}$, fixed to one of the side bars of the carriage $C^{14}$ referred to, said auxiliary lock being elevated to engage a shoulder $b^{100}$ at one side of the notch $b'$ then opposite it in the ring $b$, just as the rotation of the platen should be arrested, the auxiliary lock preventing any excess of movement of the platen about the post $C^9$, said auxiliary lock rising into position a little in advance of the reëngagement of the ring $b$ of the platen by the main lock, the platen having been partially rotated.

The carriage $C^{14}$ referred to (see Figs. 2, 3, and 12) has a coupling device (shown as a pin $h$) which is engaged by one end of a lever $h'$, loosely mounted on a suitable screw $h^2$, said lever being acted upon and normally held down by a spring $h^4$, surrounding a threaded rod $h^5$, rising from said carriage and provided with a thumb-nut $h^6$, the under side of said lever having a notch (see Fig. 3) to coöperate with a cam-finger $h^7$, (see Fig. 2,) adjustably connected with the slide $C^5$.

Whenever the slide $C^5$ is moved backward to bring the platen P up to the form, the cam-finger $h^7$, connected therewith, enters the notch in the lever $h'$, letting the pin $h$ rest on the top of the form with a pressure measured by the spring $h^4$, so that when a notch 10 of a form attached to the moving form-carrier arrives under said pin the latter pops instantly into said notch, thus coupling the carriage to the moving form-plate, and thereafter during the time that the platen is coöperating with the form to make the impression the carriage referred to is moved positively in unison with the form-bed, and the impression having been made and the slide C⁵ and platen moved outwardly the cam-finger $h^7$, before referred to, acting on the lever $h'$, raises the pin $h$ and frees the carriage from the control of the rotating bed, and the lever B², through the cam-stud B', then moves the carriage backwardly into the position that it occupied when it was started to move in unison with the form-bed. In fact the carriage $C^{14}$ is moved by the lever B² in the direction of rotation of the form-bed during the time of making the impression, but the coupling of the carriage and bed together affords absolute unison of movement and obviates any chance of blurring.

Each face of the platen is provided with sets of holders to hold the sheet or thing to be printed, and as these holders are substantially the same at each face I need describe but one set.

The lowermost grooved plate of the carriage $C^{14}$ (see Fig. 12) is provided with a spring 500, attached loosely at its end to said plate by screws 501, said spring receiving through it a rod 502, the inner end of which acts against the back of the latch $g$ above its pivot $g'$ while the impression is being made, the rod having upon it suitable adjusting-nuts 504 to thereby control the degree of pressure of the rod against the said latch, as will be readily understood.

The holders shown are composed of elbow-shaped spring-arms $m$ $m'$, pivoted at $m^2$ $m^3$, (see Fig. 6,) the arm $m'$ having a stud $m^4$, which enters a slot in the arm $m$ of such length as to enable said pin, when the arm $m'$ is moved, to move the arm $m$, the arm $m'$ having at its upper end a projection $m^6$, which, a sheet having been presented by the carrier $G^{18}$ to the platen, as will be described, is acted upon by a then upwardly-moving spring-wing $m^7$, (see Figs. 2 and 26ª,) connected to a block $m^8$, adjustably attached to a slide-bar $m^9$, (see Figs. 2 and 3,) pivoted upon the outer end of a lever $m^{10}$, pivoted at $m^{12}$, and having a roller or other stud which enters the cam-groove D⁸, said wing and slide-bar constituting holder-closing mechanism.

The upper ends of the levers constituting the holders are enlarged, and the inner edges of the enlarged parts are reduced in thickness and outturned to construct jaws opening toward each other, so as to enable the enlarged ends to slide readily onto the edges of the sheet, thereby to grasp and direct the sheet at either edge thereof. The lever $m^{10}$ has also connected to it a link $m^{13}$, which is jointed to a slide-bar $m^{14}$, (see Figs. 4, 12, and 2,) having at its lower end a projection $m^{16}$, provided with a finger $m^{17}$, which is elevated when the arms are to be opened to permit a sheet to be taken from the platen, said finger then acting on the projection $m^4$ of the arm $m'$ and effecting the opening or separation of the upper ends of the arms $m$ $m'$.

To prevent the envelop or sheet being printed from sticking to the form when the platen is being moved away from the form, which sticking might also pull the sheet away from the holders $m$ $m'$, I have provided the carriage $C^{14}$ with pull-offs $n'$ $n'$, (see Figs. 4 and 12,) made as springs, said springs lying near the surface of the form and being acted upon by the sheet being printed, near its vertical edges, during the impressing operation, the said pull-offs being pressed at such time toward the form, so that when the platen is moved away from the form they will, in resuming their normal positions, act against the printed sheet and help detach it from the form in case there was any tendency for it to stick, so that said sheet goes readily with the platen.

The sheets, cards, or whatever are to be printed are placed in the receiver G, composed, essentially, of a bottom plate and two side plates. The sheets $s$ piled in the said receiver are acted upon at their outer ends by a guide G', while their inner ends move over or against an inclined surface $v$, (see Fig. 2,) the lowermost sheet of the pile resting on a forked plate 303, (see Fig. 16ª,) adjustably connected by a screw 304 to a bottom plate G³, attached to a stationary bracket 305, attached to bracket 19, the construction and position of the parts being such that the main part of the weight of the pile of sheets will fall upon the lowermost sheets of the pile at a point near their outer ends, thus leaving their inner ends substantially free from pressure, the inner end of said plate 303 being bifurcated, so that the perforated mouth (see Fig. 17) of a suction device G⁴, pivoted at G⁵, may act against the lowermost sheet near its inner end and pull down the said end far enough to let it be grasped unerringly by a carrier, to be described.

The suction-box is hollow and has a branch 14, with which is connected a flexible pipe G⁷, in turn connected with a pipe G⁸, in turn connected with a suitable exhaust-fan G⁹, so as to cause a strong indraft of air at the mouth of the separator. The separator has an arm 15, (see Fig. 3,) provided with a cam-slot, in which enters a roller or other stud 16, carried by an arm 17 of a rock-shaft 18, mounted in an adjustable sleeve $G^{14}$, (see Fig. 12ª,) in turn mounted in a bracket 19, said rock-shaft having an attached arm $G^{16}$, to which is adjustably connected a link $G^{17}$, attached to the short arm of the sheet-carrier $G^{18}$, (see Figs. 2, 18, and 21,) pivoted on a stud 20, suitably supported by the framework.

The carrier is peculiarly constructed, that is, its upper end is slotted at $o$ from side to side and is bifurcated at $o'$. The slot $o$ receives a nipping-roll 22, which is mounted upon a spring 23, (see Fig. 18,) said spring normally acting to keep said roll in the outer end of the slot $o$. The roller 22 has an annular groove near its center, and in the bifurcation of the carrier at a point below the slot $o$ I have placed a slide-wedge 24, having a cam-surface 25 and having at each end suitable projections 26, so that the said slide-wedge cannot be forced too far in either direction.

As the cam-surface of the wedge enters the annular groove in the roll it causes the roll to rise and bite the sheet $s$ (see Fig. 21) with greater or less force between the said roll and the nipping ends 27 of the carrier, and to adapt this nipping-roll to the particular thickness of the sheet I have provided the carrier with an adjusting-plate 28, one end of which is acted upon by an adjusting-screw 29, so as to cause the said plate to lift the wedge more or less, a set-screw 30, extended through the carrier, clamping said block in its adjusted position.

The block referred to has a pin $30^\times$, which enters slots 31 in the carrier, so as to insure a straight-line movement of the block when its beveled lower end is being acted upon by the adjusting device. The wedge is acted upon at its side by a suitable spring 32, (see Fig. 18,) the stress of which is adjusted by an adjusting-screw 33. (See Fig. 18.)

When the carrier is approaching a sheet the lower end of which has been separated from the sheet above it by the separator, the wedge will be projected fully forward, (see Figs. 2 and 21,) thus putting the roll in its lowest position and opening a space for the end of the sheet between the upper side of the nipping-roll and the points 27 of the carrier, and then in the further movement of the carrier onto the sheet the wedge strikes a suitable stop, in this instance the shoulder 34 of the separator, (see Fig. 17,) and in the further movement of the carrier the nipping-roll, acted upon by the wedge, is made to nip the end of the sheet very firmly, so firmly that when the carrier is moved toward the platen the nipping-roll will maintain a very firm hold on and retain the sheet until the inner end of the wedge, as the carrier completes its forward movement, meets the wedge-releasing device 35. (See Figs. 4 and 15.)

The wedge-releasing device is shown as a finger connected with a sheet-guide composed, essentially, of U-shaped arms J J, (see Figs. 15 and 4,) the hub of which is secured to a stud $J'$, mounted loosely in a yoke $J^2$, the shank of which is adjustably secured to the framework of the machine by a suitable screw $J^3$, said stud outside said yoke having attached to it an arm $J^4$, provided with a stud $J^5$, which is acted upon normally by a suitable spring 36, herein shown as surrounding a rod 37, supposed to be connected to the framework of the machine and passed loosely through stud $J^5$, said spring being controlled as to its effective strength by a thumb-nut 38, normally keeping the U-shaped arms pressed toward the platen.

To operate the sheet-guide in opposition to this spring and to throw it toward the separator, I have in this instance of my invention provided the stud $J^5$ with an adjustable abutment 39, pivoted to arm $J^4$ and resting on a screw 440, by means of which its outer end is vertically adjusted. The outer end of this abutment is arranged immediately beneath the lower end of the slide-bar $m^9$ referred to and acts as a friction-plate for said slide-bar to bear against in its vertical movement. As the slide-bar $m^9$ descends it swings stud $J^5$ down against the resistance of spring 36, thereby rocking the stud $J'$ and operating the sheet-guide. To limit the movement of the guide-arms under the action of the said spring 36, I have also provided said stud with an adjustable stop 40, which in this instance of my invention is shown as a screw adapted to abut against the under side of the framework $A^2$. Slide $m^9$ passes through a guide-slot 445 in the frame $A^2$, which directs it against the abutment 39, as stated.

The arms J J at their upper ends are shaped each to form part of a mouthpiece $J^\times$, into which the sheet is led by the carrier, each of said arms having projecting from it a like rigid wing 42, upon which slides an edge-gage 43, acted upon by a suitable spring 44. (See Fig. 4.)

As the carrier takes a sheet from the supply-box, the sheet-guide being then in its forward position, it draws said sheet into and through the mouth of the sheet-guide and down through and between the edge-gages 43, until the leading end of the sheet meets the stop 312, (see Fig. 15,) and about as the inner end of the wedge meets the wedge-actuator 35 to release the sheet the sheet-guide is moved forward toward the platen, and at the same time the slide-bar $m^9$ is raised to close the holders $m$ $m'$ upon the side edges of the sheet and clasp it firmly upon the platen.

An ear of the head $C^{12}$ has bolted to it an arm K, (see Figs. 2, 4, 12, and 13,) provided with a stud $K'$, (see Fig. 2,) upon which is mounted an adjustable two-part link $K^2$, the length of which may be altered to suit the requirements of the work by or through the bolt $K^3$ in suitable slots in said link, the upper end of the link being substantially universally jointed to a stud $44^\times$, extended from the delivery-arm 45, fixed upon the rock-shaft 18, heretofore described as actuating the carrier.

The delivery-arm has adjustably connected to it at its outer end by screw 46, in a slot in said arm, a block 47, (see Figs. 2 and 10,) provided with a stationary nipper 48 and a movable nipper 49, which is acted upon by a spring 50 to normally close the delivery-nippers.

The spring-controlled nipper has an attached slide provided at its outer end (see Figs. 10 and 11) with an oval or cam-shaped tailpiece 51, which, as the delivery-arm is moved down to grasp and take a sheet from the platen, slides along the outer side of a wing of a spring-controlled dog-plate $55^\times$, which causes the movable nipper to be moved away from the fixed nipper, thus compressing the operating-spring 50. As soon as the said tailpiece passes off the wing of said dog-plate the spring 50 resumes control of the movable nipper 49 and closes it upon the upper end of the sheet, the said tailpiece in the upward movement of the delivery-arm riding along the inner side of the said wing, the latter, however, yielding or moving outwardly slightly, as permitted to do by a spring 52, (see Fig. 2,) the dog-plate aiding to keep the said nippers closed firmly upon the sheet.

The delivery mechanism acts to take a printed and numbered sheet from the platen while the carrier is acting to supply the platen with a sheet from the pile, and vice versa.

Alongside of the feed-box I have arranged a receiving-box L, it having a removable bottom plate L', (shown best in Figs. 2 and 24,) it being secured to a short rock-shaft 53, said bottom plate having at one end suitable stops 54, against which may be brought the end of the sheet grasped between the nippers or jaws of the delivery device, said bottom plate also having a spring-clamp composed, essentially, of a bar 55, (see Figs. 14 and 24,) on one end of which is connected in yielding manner a spring-foot 56, the bar being acted upon by a spring 57, which acts normally to move the said bar toward the center of the machine, or in the direction of the arrow. (See Fig. 24.)

The spring-foot 56 is in a plane very slightly above the receiving-surface of the bottom plate L' by reason of the offset end of bar 55, Fig. 14, and rests normally in a slot provided therefor in the outer edge of said bottom plate, so that its upturned end may receive the sheet before the sheet strikes the stops 54.

In order to grasp the sheet delicately and yet firmly, the foot 56 is spring-pressed near its outer end and guided in loose engagement with bar 55 by a stud near its free inner end.

As the delivery rises with a sheet it draws the end of the latter under the spring-foot 56 just before the end of the sheet meets the stops 54, thus enabling the delivery to deliver the end of the printed sheet to the spring-clamp of the bottom piece of the receiving-box.

The bottom piece having received a sheet, as described, is moved to carry the said sheet up against the bottom of the pile of printed sheets then in the receiving-box. To do this, the rock-shaft 53, to which the said bottom piece is connected, is provided with an arm 58, to which is adjustably attached by a suitable pin in the slot of said arm a rod 59, jointed to the lever L³, (see Fig. 3,) pivoted at L⁴, and having a roller or other stud entering the cam-groove D⁹. The lower end of the receiving-box has like spring-cheeks 60, provided with suitable fingers 61 62 63, (see Fig. 24,) the free ends of which are turned upwardly and inwardly into the receiving-box, so that as the bottom piece is raised the edges and inner end of the sheet will be lifted beyond the ends of said fingers connected to or forming parts of the spring-cheeks.

The bottom piece is slotted opposite the cheeks, and in its upward movement carries the sheet held by the clamp above the fingers of the cheeks, and the sheet is left thereon, when the bottom piece is again thrown down preparatory to receiving another sheet.

I will now describe the inking mechanism for the forms on the form-bed.

The sprocket-wheel $a$ is mounted loosely on the spindle $a'$. (See Fig. 25.) The spindle has fast to it a toothed pinion $a^2$, which engages a toothed wheel $a^3$, having an attached cam-hub $a^4$, provided with a cam-groove $a^5$, which receives a roller or other stud $a^6$, (see Fig. 2,) fast on a lever $a^7$, pivoted at $a^8$ on a stand $a^{12}$, secured to a bracket $A^{30}$, fixed to the framework, the opposite end of said lever having attached to it a link $a^9$, which in turn is attached to a lever $a^{10}$, provided with the ductor-roll $a^{13}$, said ductor-roll being adapted to take ink from the fountain-roll $a^{15}$ in the ink-fountain $a^{16}$, said fountain-roll being rotated at suitable times by a suitable pawl $a^{17}$, engaging a ratchet-wheel $a^{18}$ on its shaft, the pawl being carried by an arm $a^{19}$, pivoted at its upper end on the ink-box and deriving its movement from a link $a^{20}$, loosely connected to a lever $a^{21}$, suitably pivoted on the stand $A^{30}$ and bifurcated at its rear end (see Fig. 4) to embrace the loose block 369 on a stud 370 of the stand $a^{22}$, connected to a part of the carriage $C^{14}$. (See Figs. 2, 4, and 12.)

The ductor-roll, when elevated, is made to transfer ink from the fountain-roll to the inking-rolls $a^{23}$, I showing in this instance of my invention six inking-rolls, (see Fig. 2,) each having its end journals mounted in like manner in arms $a^{27}$ $a^{28}$, (see Figs. 25 and 26,) pivotally mounted upon suitable like studs 60 61, connected with rotating heads $a^{29}$ $a^{30}$, fixed on shaft $a'$, each of said arms having suitable pins 62 63, which enter curved slots in said heads, suitable springs, as $a^{32}$, acting on each of said pins to normally keep the free ends of the arms pressed outwardly away from the centers of said heads.

The arms $a^{27}$ are normally kept down by springs $a^{33}$, surrounding the pivots on which they turn, said springs permitting said arms to be raised at the proper times, as when it is desired to remove an inking-roll, for when said arms are raised the inking-rolls may be readily lifted out from the lower arms $a^{28}$.

The shaft of each inking-roll has two anti-friction-rollers 64, which in the rotation of the heads, as will be described, are made to travel along suitable tracks $a^{36}$ $a^{37}$, and when said rolls are traveling thereon the springs $a^{32}$ keep them against the tracks, the rolls controlled by said tracks traveling substantially straight across the faces of the forms.

The shaft $a'$ above the pinion $a^2$ (see Fig. 25) is extended through a hollow sleeve $n$, which is held against rotation in the bracket $A^{30}$ and is surrounded loosely by the distributing-bed $n^2$, the upper end of said shaft just below the head $a^{29}$, mounted on said shaft, having fast upon it a gear $n^3$, which engages a pinion $n^4$, fast on a shaft $n^5$, extended loosely through said distributing-bed, the lower end of said shaft having a pinion $n^6$, which engages a pinion $n^7$, fast to the lowermost head $a^{30}$, which is mounted loosely upon the sleeve $n$, said head being also loose with relation to said shaft $a'$, the lowermost head deriving its rotation in unison with the uppermost head by or through the shaft $n^5$ described and the gears thereon.

Now in order to effect the proper distribution of the ink upon the distributing-bed, so that the inking-rolls may take it uniformly from said bed, I have made the distributing-bed movable vertically, rather than the inking-rolls, and to effect this reciprocation of the distributing-bed I have provided it at its lower end with a finger $n^8$, (see Fig. 25,) having a roller or other stud $n^9$, which enters the cam-groove $a^5$, before described.

The distributing-bed is made as a cylinder with a secant side, (see Fig. 13$^a$,) the secant side being next the form-bed and forms, so that the inking-rolls may have ample opportunity to move in a straight line in succession across the form.

As herein shown I have preferred to number the sheets preparatory to printing them, as that order of operation may, in the present embodiment of my invention, be the more easily effected.

The numbering device herein shown consists, essentially, of a series of four numbering-wheels 66, (see Fig. 4,) each provided with numbers from "0" to "9," inclusive. These wheels in practice have connected to them suitable ratchet-teeth, and they are mounted upon a suitable spindle in a frame 67, said wheels being adapted to be ratcheted about in usual manner by suitable pawls, the units-wheel completing a rotation before the tens-wheel starts, and the tens-wheel completing a rotation before the hundreds-wheel starts, &c., all as is well known.

I have mounted the frame carrying the numbering-wheels, which may be of any usual construction, upon a block 68, connected with a rock-shaft 69 (see also Fig. 3) in a suitable bearing 70, bolted to a lever 71 near its upper end. The lever 71 is pivoted at 72 upon a yoke 73, mounted upon pivot-studs 74, the points of which enter pits in the ends of the stud $C^{13}$, before described, said lever having a projecting arm 75, (removed in Fig. 4,) provided with an inclined dog 76, (see Figs. 3, 16, and 20,) made adjustable thereon by a suitable adjusting-screw 77, clamp-screws 78 holding the dog in adjusted position.

The arm 75 lies in the range of movement of the platen, and the platen in its outward movement, it having been revolved and locked in position, meets the said arm and thereafter moves the arm and lever 71 back in unison with it, causing the cam projection 76 to meet a roll 79 at the end of a finger 80, (see Fig. 19,) fixed on the framework, (see Fig. 3,) the dog 76, riding over said roll, causing the lever 71 to be turned on its pivot 72 against the spring 72$^a$, adjacent to the limiting-stop 72$^b$ and stud 72$^c$, Fig. 16, thus carrying with it the rock-shaft 69, upon which, as before stated, is mounted the numbering-device-carrying block 68, so that said numbering device is caused to act against and number the sheet then held on the face of the platen.

The rock-shaft 69 referred to has an arm 73$^\times$, provided with a stud 74$^\times$, upon which is mounted a forked arm 75$^\times$, bearing an inking-roller 76$^\times$, a spring 77$^\times$, (see Fig. 3,) fixed at one end to said stud and to a pin or projection on said arm, causing said inking-roller to travel over the ink-face of the distributing-plate 78$^\times$, (shown as a circular table,) supplied with ink by hand or in any other suitable manner.

When the rock-shaft 69 is moved in the direction of the arrow near it in Fig. 16, the inking-roll will travel upwardly across the distributing-plate, and at the same time the numbering device will come down to and be met by the surface of the inking-roll and take ink therefrom, and in the reverse movement of said rock-shaft the numbering device is brought up into working position to again meet a sheet on the platen as the lever 71 is turned, as described.

The rock-shaft 69 derives its movement in the following manner, viz: At it outer end it has an arm $p$, provided with a stud $p'$, having, preferably, a ball-shaped head embraced by a box at the upper end of a connecting-rod $p^2$, herein shown as made in two parts, so as to be longitudinally adjustable as to length, the lower end of said connecting-rod having a box $p^3$, having a spherical seat to embrace a ball-shaped head (see Fig. 13) at the outer end of a stud $p^4$, carried by a lever $p^5$, connected rigidly to the ears of the head $C^{12}$.

The shaft $a'$ below the pinion $a^2$ has splined on it a collar 80$^\times$, provided at its opposite ends with suitable pins, an annular groove in said collar being entered by a projection from a hand-lever 81, mounted on a pin 82 of a stud 83, so that said collar may be raised to uncouple it from the sprocket-wheel $a$ and leave the shaft $a'$ at rest, or lower it to couple it to said sprocket-wheel, as when the said shaft is to be rotated and the inking-rolls be made to travel about the distributing-bed and furnish ink to the form, said stud serving as the center of motion for the cam-hub $a^4$ and its gear $a^3$.

The rock-shaft 18, employed for operating the sheet-delivery and the sheet-carrier, is extended, as stated, through a hollow sleeve-bearing or nut $G^{14}$. Said bearing (see Fig. 12$^a$) is threaded externally and provided at one end with a head 84, against which bears the delivery-arm 45 as the latter is moved, and if it is desired to adjust the delivery-nippers toward or from the face of the platen, so as to properly engage the sheet, it is only necessary to turn the said nut and adjust the said bearing longitudinally until the head against which the delivery-arm bears is at the proper distance to enable the nippers to exactly and accurately engage the edge of the sheet.

In numbering sheets in consecutive series, as from one to nine hundred and ninety-nine, each sheet of the same series having the same number, but the sheets of each series having a different number, it is necessary to operate the numbering device once during each revolution of the movable bed. To effect this automatic movement of the numbering device to count consecutively, I have provided the bed with a cam $r$, (see Fig. 3,) which at each revolution of the bed strikes a pin $r'$, mounted in the carriage $C^{14}$, causing said pin to act upon the inner end of a lever $r^2$, (see Fig. 12,) pivoted at $r^3$, the outer end of said lever acting upon a slide-rod $r^4$, mounted in suitable ears of the said carriage, causing said slide-rod to be depressed against the action of a suitable spring $r^5$. This slide-rod carries an arm $r^6$, (see Figs. 3 and 4,) which in each rotation of the bed is depressed and made to act upon the end of a lever $r^7$, which I have pivoted upon the block 68, said lever carrying the actuating-pawls for the numbering device.

In practice the lever $B^2$ draws upon and would move the carriage $C^{14}$ in the direction of travel of the bed were it not for the locking together of the carriage and the bed, but by locking the carriage and the bed together during the time that the platen is coöperating with the form to make an impression I am enabled to gain a double accuracy and insure an absolute unison in movement without the possibility of one slipping with relation to the other, which would result in blurring the print.

The lever 71, carrying the numbering mechanism, is held pressed toward the form-bed by means of a strong spring 90. (Best represented in Fig. 4.)

As so far described the platen employed has been referred to as a "multisided" platen, but in Fig. 28 the platen has but one acting face.

Referring to Fig. 28, let C represent the form-bed in top plan, supposed to be provided in usual manner with forms, and $C^{14}$ part of the carriage mounted thereon, the said carriage receiving motion on said bed while the impression is being made by the lever $B^2$ and link $B^5$, as already provided for.

In the modification, 506 is supposed to represent the top of the frame, mounted by a pivot 507 on the carriage $C^{14}$. In practice there will be two such plates 506, one directly below the other, and one attached to the upper and the other to the lower end of the platen 508, partially shown by breaking away the upper plate 506. The plate 506 is shown as provided with a stud 510, which is encircled by a strap at the forward end of a link 512, corresponding in purpose and function with the link marked $C^3$ in Fig. 2, each link deriving its motion in substantially the same manner.

The single-faced platen referred to and pivotally mounted upon or with relation to and movable with the carriage on the bed may also be moved toward and from the forms carried by the form-carrier, as described of the multisided platen.

The single-faced platen may have coöperating with it suitable carrying devices to present a sheet to the platen and then to effect the taking away of the printed sheet.

The types or wheels hereinbefore designated under the term "numbering devices or mechanism," together with the inking devices coöperating therewith, constitute what I may designate in some of the claims as an "auxiliary printing mechanism," for it will be obvious that the said types or wheels may be readily exchanged for other suitable types or printing-characters adapted to print words or other symbols, according to the matter it may be desired to print upon the sheet while the latter is held on the platen. The printing done by this auxiliary printing mechanism may be in the same color or in a different color from that used in connection with forms on the form-bed; and I consider as within the scope of my invention the use of any type or printing-character instead of the numbering-wheel.

In my invention the auxiliary printing mechanism acts to print a sheet held on the platen, and while the sheet is held on the platen and before it is discharged therefrom it is also pressed against the form on the form-bed, so that each sheet coöperates with two different printing mechanisms.

I have herein shown but one carriage $C^{14}$ as mounted upon or coöperating with the rotary form-carriage, but I do not limit myself to one, as I may use a series of said carriages and platens mounted thereon and arrange them about the form-bed at suitable distances apart, and this may be done merely by duplicating the carriages and platens and carriers to present the sheets to the platen and delivery devices to take the sheets away from the platen, and each set of devices coöperating with the form-bed may be operated in like manner, this being easily done owing to the devices being arranged around a common center.

My invention herein set forth is broadly novel in its main features, and in view thereof I wish it to be understood that I do not limit myself in any respect otherwise than as set forth in the following claims.

The various details of construction may be widely varied in form and arrangement within the scope of my invention. For instance, the platens may have one or more faces, as preferred, and the invention is not limited to the exact shape of the platen, the number of its sides, or the exact devices shown for effecting the movement of the platen, nor to the devices shown for providing the platen with sheets or taking printed sheets therefrom; nor is this invention limited to the exact means shown for automatically rotating the many-sided platen step by step, nor to the means shown for moving said platen to and fro with relation to the form-bed carrying the series of forms, nor to devices for moving said carriage and its platen with relation to the form-bed, nor to the means shown for inking the forms, as said means and devices may be variously modified and yet accomplish the result herein described; nor is this invention limited to the exact devices shown for moving the form-bed.

Having described my invention, what I claim as new, and desire to secure by Letters Patent, is—

1. In a press, a continuously-rotatable form-bed carrying a series of forms, and means to continuously rotate said form-bed, combined with a series of platens, means to reciprocate them toward and from said form-bed to coöperate in succession with the forms, and mechanism to cause the platens to move in unison with the forms while making impressions, substantially as described.

2. In a press, a continuously-rotatable form-bed carrying a series of forms, combined with a series of platens, and means to move them toward and from said form-bed and also backward and forward with relation to the direction of rotation of said bed to coöperate in succession with the forms, substantially as described.

3. In a press, the following instrumentalities, viz: a continuously-rotatable form-bed having a plurality of forms, means to rotate the same continuously, a multisided platen, means to rotate said platen intermittingly, and means to move said platen and form-bed toward and from each other, substantially as described.

4. In a press, the following instrumentalities, viz: a rotatable form-bed having a plurality of forms, a multisided platen also rotatable, means to continuously rotate one of said rotatable members, means to intermittingly rotate the other of said members, and means to move said platen and form-bed toward and from each other, substantially as described.

5. A rotatable form-bed having a series of forms, and a carriage having a platen movable toward and from the form-bed, combined with devices to cause the carriage and platen to move in unison with the form-bed while making an impression and between printing impressions to be moved in opposition to the movement of said form-bed, substantially as described.

6. A rotatable form-bed having a series of forms, and a carriage having a multisided platen movable toward and from the form-bed, combined with devices to cause the carriage and platen to move in unison with the form-bed while making an impression, and between printing impressions to be moved in opposition to the movement of said form-bed, substantially as described.

7. In a press, the following instrumentalities, viz: a form-bed provided with a series of forms; means to rotate said form-bed; a multisided platen, sheet-holding devices, a carriage on which said platen is mounted, means to rotate said platen and to move it toward and from the form-bed, and devices to couple the carriage having the platen to said form-bed while the sheet is being printed, substantially as described.

8. In a press, a rotatable form-bed carrying a series of forms, combined with a series of platens, means to impart a relative reciprocal movement to said platens and said forms toward and from each other, to cause the platens to coöperate in succession with the forms in succession, means to continuously move one of said series, means to intermittingly move the other of said series, and mechanism to cause the platens to move in unison with the forms while making impressions, substantially as described.

9. In a press, a rotatable form-bed carrying a series of forms, combined with a platen and means to move it toward and from said form-bed to coöperate with the forms in succession, and devices to supply said platen with sheets, consisting of a sheet-separator, a carrier, and a pivoted sheet-guide to direct the edges of the sheets, substantially as described.

10. In a press, a movable form-bed having attached to it a series of forms, a carriage, and devices to move it on said form-bed, combined with a platen mounted upon and movable with said carriage, and devices to move the platen toward and from the forms on the form-bed, for the purposes set forth.

11. In a press the following instrumentalities, viz: a form-bed provided with a series of forms; a multisided platen provided with sheet-holding jaws, movable laterally to grasp the edges of the sheet, a supply-box to supply sheets, a carrier to take the sheets singly from the supply-box and present them to the sheet-holding jaws attached thereto, means to rotate said platen and to move the same toward and from the said form-bed, substantially as described.

12. In a press, the following instrumentalities, viz: a form-bed provided with a series of forms; a multisided platen provided with opposing sheet-holding jaws for the sheets at their opposite edges, a supply-box to supply sheets, a carrier to take the sheets singly from the supply-box and present them to the sheet-holding jaws attached to said platen to be held thereby against their said edges, means to rotate said platen and move the same toward and from the said form-bed, and delivery mechanism to take the printed sheets from the said platen, substantially as described.

13. In a press the following instrumentalities, viz: a form-bed provided with a series of forms; a multisided platen provided with sheet-holders, a supply-box to supply sheets, a carrier to take the sheets singly from the supply-box and present them to the sheet-holders attached to said platen, means to rotate said platen and to move the same toward and from said form, delivery mechanism to take the printed sheet from the platen, a receiving-box, and devices between said delivery mechanism and said receiving-box to put the printed sheets into said box, substantially as described.

14. In a press, a circular form-bed provided with a series of forms and having its edges shaped to form tracks, combined with a carriage mounted on said tracks, a platen mounted on said carriage, and means to reciprocate said carriage on said track, substantially as described.

15. The circular form-bed having notches, the platen-carrying carriage mounted thereon and provided with a spring-controlled locking device to engage said notches, combined with devices to move said locking device in opposition to its operating-spring to disconnect the said carriage from the said bed, substantially as described.

16. The circular form-carrying bed, the carriage mounted thereon and having a guideway, a slide fitted in said guideway, an arm pivoted in said slide, and a head pivoted on said carriage and provided with a post, the upper end of which is engaged by the arm of said slide, combined with a multisided platen mounted on said post, and with means to rotate said platen and to move the said slide in said guideway to effect the movement of the platen toward and from the said bed, substantially as described.

17. The carriage, the head pivoted thereon provided with a post, a multisided platen mounted on said post, said platen having fixed to its lower end a notched ring, a loose pawl-ring provided with notches and applied to the upper end of said platen, a pawl carried by said platen to be engaged by said loose ring to rotate the platen, devices to partially rotate said loose pawl-ring in said platen, and a locking device carried by said head and adapted to engage the notched ring fixed to the lower end of said platen, substantially as described.

18. The form-bed provided with a series of forms, a carriage mounted thereon, a head pivoted on said carriage and provided with a post, a main and an auxiliary locking device mounted on said head, combined with a multisided platen mounted loosely on said post and having fixed to its lower end a ring provided with a series of notches; and means to rotate said platen and to operate said main and auxiliary locking devices to effect the release of the said platen when the latter is to be rotated, locking it against rotation at all other times, substantially as described.

19. In a press, a circular form-bed, a carriage mounted thereon, a head pivoted on said carriage and having a post, a multisided platen mounted on said post and provided with a pawl, a pawl-ring mounted loosely in the upper end of said platen, a link jointed to said pawl-ring, a shoe connected to said link, a friction-box in which said shoe is fitted to slide frictionally, and means to move said platen toward and from said form-bed, the platen during a portion of its outward movement being rotated by or through the action of the pawl-ring on the pawl of the platen, the said pawl-ring being held while the platen is being moved outwardly, substantially as described.

20. The carriage, a head pivoted thereon having a post, a multisided platen mounted loosely on said head and having at each of its faces a pair of sheet-holders made as spring-arms, said holders having their short arms connected together, whereby the movement of one holder moves the other in unison with it, combined with means to act upon one of said holders to cause the same to pass over and engage the edges of a sheet laid upon said platen, substantially as described.

21. The carriage, a head pivoted thereon having a post, a many-sided platen mounted loosely on said head and having at each of its faces a pair of sheet-holders made as spring-arms, said holders having their short arms connected together, whereby the movement of one holder moves the other in unison with it, combined with means to act upon one of the said holders to separate the same to enable the printed sheet to be taken from the said platen, substantially as described.

22. In a press, a form-bed having a series of forms, a carriage mounted thereon, a head pivoted on said carriage and provided with a post having a ball-shaped top, a multisided platen mounted loosely on said post, an arm having a semispherical recess to engage the ball-shaped upper end of said post, means to connect said arm with said post, a slide upon which said arm is pivoted, a guideway forming part of said carriage and in which said carriage is free to reciprocate, a link having at one end an eccentric-strap, an eccentric inserted in said strap, a post carried by said slide and upon which said eccentric is fitted, combined with means to move said eccentric-link, the adjustment of the eccentric determining the extent of movement of said platen toward and from the form-bed, substantially as described.

23. The ink-distributing cylinder having at one side of its center a secant face, a rotating shaft extended through said distributing-cylinder and provided with a disk $a^{29}$ having a series of bearings, a second disk $a^{28}$ loose with relation to said shaft and having a series of bearings, a gear $n^7$ attached to disk $a^{28}$, a gear $n^3$ fast to the disk $a^{29}$ secured to said shaft, a shaft $n^5$ having pinions and engaging said gears, whereby the two disks are made to rotate in unison, combined with a series of inking-rolls having their journals mounted in said bearings, substantially as described.

24. The ink-distributing cylinder having at one side of its center a secant face, a rotating shaft extended through said distributing-cylinder and provided with a disk $a^{29}$ having a series of bearings, a second disk $a^{28}$ loose with relation to said shaft and having a series of bearings, a gear $n^7$ attached to a disk $a^{28}$, a gear $n^3$ fast to the disk $a^{29}$ secured to said shaft, a shaft $n^5$ having pinions and engaging said gears, whereby the two disks are made to rotate in unison, combined with a series of inking-rolls having their journals mounted in said bearings, a series of antifriction-rolls mounted on the journals of said inking-rolls, means to rotate said cylinder-shaft, and tracks $a^{36}$, $a^{37}$, upon which said antifriction-rolls travel while the inking-rolls are inking the forms on the form-bed, substantially as described.

25. The supply-box having a bottom plate, a curved guide for the outer ends of a pile of sheets mounted on said bottom plate, and against which the said outer ends abut, removed from the carrying mechanism, whereby the inner ends of the lowermost sheets are so located as to be substantially free from pressure of the pile of sheets, combined with a separating device to coöperate with the inner end of the lowermost sheet and move it away from the sheet above it, and with a carrier to engage the end of said sheet and detach it from the pile in the said supply-box, substantially as described.

26. A supply-box for a pile of sheets, combined with a carrier having a notch, a nipping-roll mounted in said notch and supported by a spring, combined with a sliding wedge to coöperate with said nipping-roll to cause it to grip the end of a sheet closely or to permit the end of a sheet to be released, and means to move said carrier, to operate, substantially as described.

27. In a printing-press, the following instrumentalities, viz: a supply-box for a pile of sheets, a multisided platen having a series of sheet-holders, a carrier having a nipping-roll, means to move said carrier and cause it to engage between itself and said nipping-roll the end of a sheet, a sheet-guide through which the said carrier carries the said sheet on its way to the sheet-holders of the platen, devices to move said nipping-roll to effect the release of said sheet when applied to the platen, and means to actuate said holders to engage the sheet presented to the platen by the said carrier, substantially as described.

28. The combination with a platen having sheet-holders, and means to move said sheet-holders to release a printed sheet, of a delivery device consisting of an arm, a block carried thereby, said block having a pair of jaws, one jaw being stationary and the other jaw being movable relatively to said block, said jaws having broad nipping-faces lying in parallel planes throughout their movement, means to open said jaws to grasp the end of the printed sheet, a spring to close said jaws, and means to move the arm carrying said jaws, to operate, substantially as described.

29. The receiving-box provided with spring-cheeks having inwardly-projecting fingers to support the pile of printed sheets inserted in said box from its lower end, and a movable bottom plate provided with a clamp to engage one end of a sheet, means to move said bottom plate to pass a sheet carried by it into the open lower end of said receiving-box and above said spring-cheeks, combined with a delivery device consisting of a lever having a pair of jaws to grasp a printed sheet and pass the end of said sheet into the spring-clamp carried by said bottom plate, as and for the purpose described.

30. The receiving-box, provided with a swinging bottom plate hinged thereto, guide-flanges thereon to receive a sheet, stops thereon to limit and properly aline the sheet in its movement, and a receiving-foot normally spring-pressed adjacent to said bottom plate at one side edge thereof, said foot being yieldingly adjusted in loose gripping contact with its support, substantially as described.

31. A rotatable form-bed having a series of forms, a carriage mounted thereon, and a platen mounted on said carriage, combined with devices to move the said platen toward and from said form-bed, and a device independent of said platen secured to the carriage and interposed between said platen and form-bed in the path of movement of the latter and arranged to be engaged by the sheet on the moving platen and sprung toward said form-bed, whereby the tendency of said device to regain its normal position causes the sheet to move with the platen away from the form-bed, to operate substantially as described.

32. A form-bed having a series of forms, a carriage, a multisided platen supported upon said carriage and provided with sheet-holders, combined with means to move said platen toward and from said bed, and with devices to act upon said sheet-holders and move them toward each other to engage and hold a sheet against the edges thereof, substantially as described.

33. The ink-distributing cylinder having at one side of its center a secant face, a rotating shaft extended through said distributing-cylinder and provided with a disk $a^{29}$, a second disk $a^{28}$ loose with relation to said shaft, a gear $n^7$ attached to disk $a^{28}$, a gear $n^3$ fast to the disk $a^{29}$ secured to said shaft, a shaft $n^5$ having pinions and engaging said gears, whereby the two disks are made to rotate in unison, the pivoted bearings for the inking-rolls mounted on disks $a^{28}$, $a^{29}$, and means to press said bearings outwardly, combined with a series of inking-rolls having their journals mounted in said bearings, to operate, substantially as described.

34. In a press, a movable form-bed, a rotatable platen having a plurality of sides, and means to move said platen and form-bed toward and from each other, combined with devices to cause the same to move in unison while making an impression, substantially as described.

35. In a press, a rotatable form-bed having a plurality of forms, a movable platen, and means to move said platen and form-bed toward and from each other, combined with devices to cause the same to move in unison while making an impression, substantially as described.

36. The delivering device, comprising a base-block provided on its outer surface with a stationary nipper having its free nipping end projecting over a recess in said block, said recess, a movable nipper arranged to reciprocate in said recess, and a spring normally pressing the same against the under side of said stationary nipper, said block being suitably mounted to move back and forth in the delivery of sheets, substantially as described.

37. In a press, the combination with a platen, of sheet-holders, said holders being provided at their upper ends with jaws opening inwardly toward each other, and arranged to grasp and direct the sheet at either edge thereof, said holders being movable with the platen to hold the sheet thereon in proper adjustment for printing, substantially as described.

In testimony whereof I have signed my name to this specification in the presence of two subscribing witnesses.

HENRY H. CUMMINGS.

Witnesses:
GEO. W. GREGORY,
LAURA T. MANIX.